P. EZZO.
COFFEE ROASTER.
APPLICATION FILED OCT. 31, 1916.

1,224,620.

Patented May 1, 1917.

WITNESS
Howard P. King

INVENTOR:
Pasquale Ezzo,
BY
Marble & Everett,
ATTORNEYS.

UNITED STATES PATENT OFFICE.

PASQUALE EZZO, OF NEWARK, NEW JERSEY.

COFFEE-ROASTER.

1,224,620.

Specification of Letters Patent.

Patented May 1, 1917.

Application filed October 31, 1916. Serial No. 128,676.

*To all whom it may concern:*

Be it known that I, PASQUALE EZZO, citizen of the United States of America, and a resident of Newark, in the county of Essex and State of New Jersey, have invented new and useful Improvements in Coffee-Roasters, of which the following is a specification.

The objects of this invention are to provide a coffee roaster of improved construction for domestic use and by means of which the householder may each morning roast the coffee beans desired for that morning's breakfast, the same afterward being ground and prepared as usual; to provide such a roaster which can be set over the burner of a gas stove and the coffee roasted evenly and without danger of burning, although exposed to the full heat; to secure a construction by which the coffee is readily put into and removed from the roaster and yet the roaster is tightly and securely closed during the roasting operation; to secure a simple and convenient device, and to obtain other advantages and results as may be brought out in the following description.

Referring to the accompanying drawings, in which like numerals of reference indicate the same parts throughout the several views, Figure 1 is a plan of my improved device;

Figure 1:
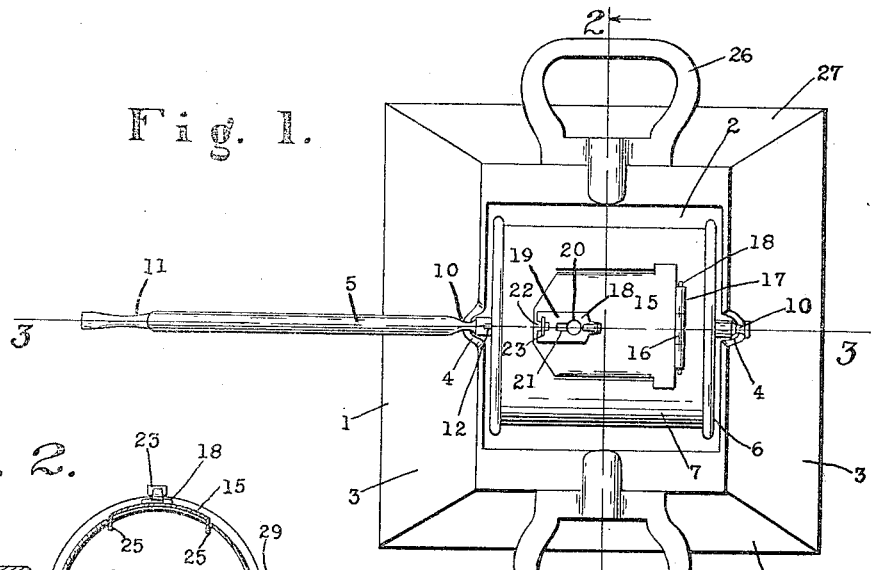
Figure 2:
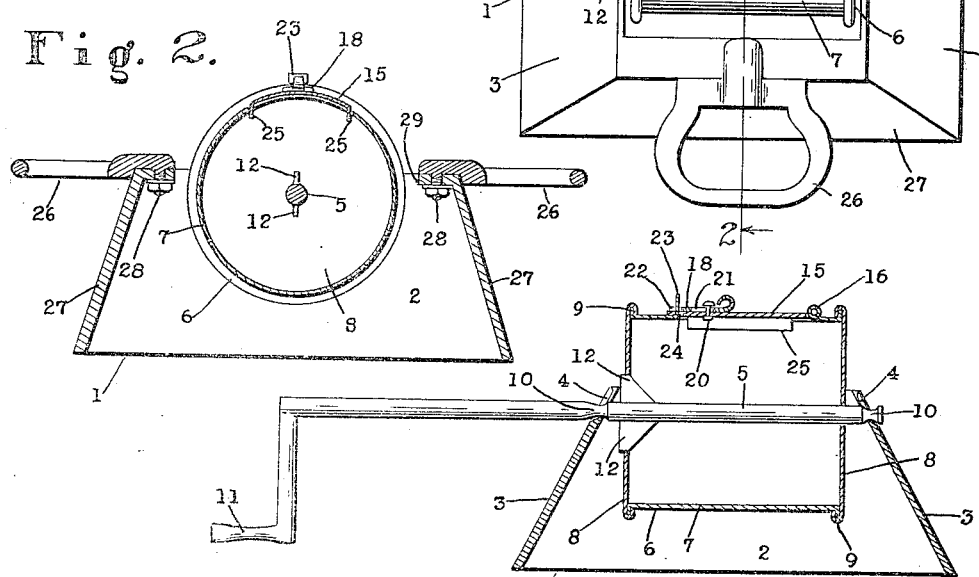
Fig. 2 is a section of the same on line 2—2, Fig. 1.
Figure 3:
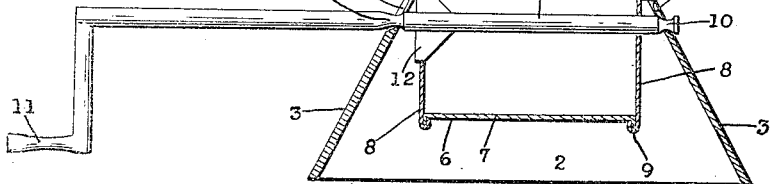
Fig. 3 is another section on line 3—3, Fig. 1.
Figure 4:
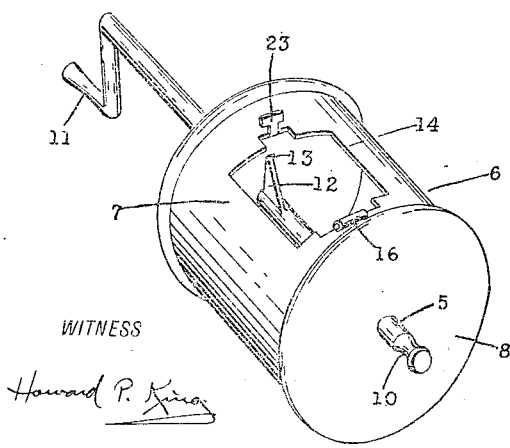
Fig. 4 is a perspective view of the rotary drum or container of the roaster with its side door or closure removed.

In the specific embodiment of the invention illustrated in said drawings, the reference numeral 1 indicates a hollow base preferably having sides which slope inwardly upward and forming an interior chamber 2. Preferably the top and bottom of the sides of the base are in substantially parallel planes, the base being adapted to be positioned over the burner of a gas stove or the like with the bottom edges of said sides resting thereon. It is to be understood that the top and bottom of the base are open so the heat from the flame may pass directly into the interior chamber of the base from its bottom and upwardly out of the top opening, said openings preferably being rectangular. At the middle of two opposite sides, as 3, 3, recesses or bearing notches 4, 4 are cut downwardly from the upper edges, the same being adapted to receive the axle 5 of a drum 6.

The drum 6 as shown in the drawings, preferably comprises a sheet metal cylinder 7 closed at its ends by sheet metal heads 8 secured thereto in any suitable manner. For purposes of illustration the ends of the cylinder 7 are flared radially outward forming flanges 9 the peripheral margins of the heads 8 are crimped over the flanges 9 thus forming a tight joint which will not become separated by heat. This drum is preferably of sufficient length and diameter to substantially fill the upper opening through the top of the base, whereby all of the heat from the flame will be concentrated upon the drum. The axle 5 extends axially through said cylinder as shown, projecting at each end and providing grooved bearing portions 10, 10 beyond each end of the drum adapted to seat in the recesses or notches 4, 4 of the sides 3, 3. One end of the axle 5 is longer than the other, and provides a suitable crank or handle 11 by means of which the axle may be turned, said axle and crank being shown herein as formed integrally, although it will be understood this may be otherwise if desired. It is to be noted that the axle is adapted to rotate the drum, and to secure the two parts non-rotatably together I provide radially projecting fins 12, 12 on the axle adapted to be positioned in suitable slots 13 in the end wall of the drum. Preferably, these fins are adjacent the hollowed bearing portion 10 toward the middle of the axle. In this manner the drum is held non-rotatably on the axle but may be slid longitudinally thereof and the axle withdrawn when so desired as for cleaning.

At one side of the cylinder 7, an opening 14 is provided for introducing or removing the coffe, and a suitable door or cover 15 is preferably hingedly mounted at one end of this opening for closing the same while the drum is being rotated with the coffee therein. As shown, the metal forming the cylinder 7 is rolled at one end edge of the opening 14 providing a hinge member 16, and a door 15 is provided with similar hinge members 17, 17 adapted to lie at opposite ends of said member 16 on the drum and all receive a hinge pin 18. At the other end of the door or cover suitable securing means are provided preferably comprising a bolt 19 slidable on the top of the door and secured thereto as by a rivet 20 upon which the bolt is slidably mounted by means of a slot 21 arranged longitudinally of the bolt. Another longitudinal slot 22 is provided at the end of the bolt toward the free end of the door adapted to engage under a suitable shoulder or keeper 23 fast upon the drum. This keeper as shown, comprises a portion of the metal forming the cylinder stamped to project outwardly from the drum substantially in a radial direction. A slot 24 in the cover is arranged to take around the keeper 23 which will accordingly project through the door when the same is closed. The bolt may then be slid toward the keeper so that its slot 22 will take around the neck of the same and underlie a suitable T-head, thus securely preventing the door from being opened.

Preferably the side edges of the door are bent inwardly of the drum providing flanges 25 which project into the drum. These flanges serve in the operation of the device to stir the coffee beans up so that they cannot simply slide along the inside of the drum without rolling over or changing position. This prevents the coffee beans from becoming burnt or scorched and obtains a very even and thorough roasting.

Preferably the base is provided with suitable handles 26, 26 by means of which the same may be lifted or carried, and these handles are shown as projecting from the two sides 27, 27 not having the bearing notches. Furthermore, these handles are preferably at the top of the base so that its weight will be below the handles and consequently there will be no tendency for the device to tip over when the same is lifted. For illustrative purposes the handles are shown separable from the base, being secured to the top by means of bolts 28 extending through the top portions 29 of the sides, although this might be otherwise if desired.

Obviously various modifications and changes may be made in the manufacture of my improved coffee roaster, without departing from the spirit and scope of the invention, and I do not wish to be understood as restricting myself except as required by the following claims, when construed in the light of the prior art.

Having thus described the invention, what I claim is.

1. In a device of the character described, the combination of a hollow base adapted to seat over a burner of a gas stove or the like, said base having at its top a rectangular opening with bearings at the middles of two opposite sides, and handles projecting from the middles of the two other opposite sides, a shaft removably mounted in said bearings with one end projecting and provided with a crank handle, said shaft having between the two bearings and adjacent the bearing nearer the crank handle a radially projecting fin, a hollow cylindrical drum or container having in its opposite ends axial apertures for said shaft, one provided with a radial extension to receive said fin and cause said drum or container to rotate with the shaft and yet be removable therefrom, said drum or container substantially filling the rectangular opening at the top of the base, and having a door or closure at one side providing access to its interior.

2. In a device of the character described, the combination with a hollow base adapted to seat over the burner of a gas stove or the like, said base having at its top a rectangular opening with bearings at the middles of two opposite sides, a shaft removably mounted in said bearings with one end projecting and provided with a crank handle, of a hollow cylindrical drum or container axially and nonrotatably receiving said shaft, and adapted to substantially fill the rectangular opening in the top of the base, said drum or container having at one side thereof a hinged door or cover with flanges upon the inner side thereof adapted to project into the drum or container when the door is closed and extend longitudinally thereof, whereby the contents of the drum or container are agitated as the same is revolved.

3. In a device of the character described, the combination with a hollow base adapted to seat over the burner of a gas stove or the like, said base having at its top a rectangular opening with bearings at the middles of two opposite sides, a shaft removably mounted in said bearings with one end projecting and provided with a crank handle, of a hollow cylindrical drum or container axially and nonrotatably receiving said shaft, and adapted to substantially fill the rectangular opening in the top of the base, said drum or container having at one side thereof a longitudinal door or cover hinged at one end transversely to the container and having at its other end suitable removable fastening means and said door or cover having its opposite longitudinal edges bent or turned inward so as to form flanges which project into the drum or container when the door is closed and agitate the contents thereof as the same is revolved.

In testimony whereof I have signed this specification in the presence of two subscribing witnesses.

PASQUALE EZZO.

Witnesses:
HOWARD P. KING,
MILDRED E. BROOKS.

Copies of this patent may be obtained for five cents each, by addressing the "Commissioner of Patents, Washington, D. C."